US012545788B2

(12) United States Patent
Grove et al.

(10) Patent No.: US 12,545,788 B2
(45) Date of Patent: Feb. 10, 2026

(54) CRISTOBALITE AS A PIGMENT SUBSTITUTE AND AS A COMPOSITION ENHANCING MINERAL, COMPOSITIONS CONTAINING THE SAME, AND ARTICLES AND COATINGS PREPARED WITH SUCH COMPOSITIONS

(71) Applicant: U.S. Silica Company, Katy, TX (US)

(72) Inventors: Dale Addison Grove, Hagerstown, MD (US); Christopher Anderson, Granville, OH (US); Alain Lambert, Thetford Mines (CA); Qun Wang, Reno, NV (US)

(73) Assignee: U.S. Silica Company, Katy, TX (US)

( * ) Notice: Subject to any disclaimer, the term of this patent is extended or adjusted under 35 U.S.C. 154(b) by 765 days.

(21) Appl. No.: 17/747,413

(22) Filed: May 18, 2022

(65) Prior Publication Data

US 2022/0372299 A1 Nov. 24, 2022

Related U.S. Application Data

(60) Provisional application No. 63/189,781, filed on May 18, 2021.

(51) Int. Cl.
| | |
|---|---|
| *C09D 7/62* | (2018.01) |
| *C01B 33/18* | (2006.01) |
| *C08K 9/06* | (2006.01) |
| *C09C 1/30* | (2006.01) |
| *C09C 3/00* | (2006.01) |
| *C09C 3/04* | (2006.01) |
| *C09C 3/12* | (2006.01) |

(52) U.S. Cl.
CPC ............ *C09C 1/309* (2013.01); *C01B 33/181* (2013.01); *C08K 9/06* (2013.01); *C09C 1/3018* (2013.01); *C09C 1/3081* (2013.01); *C09C 3/006* (2013.01); *C09C 3/041* (2013.01); *C09C 3/12* (2013.01); *C09D 7/62* (2018.01); *C01P 2004/61* (2013.01); *C01P 2006/11* (2013.01); *C01P 2006/62* (2013.01); *C01P 2006/63* (2013.01); *C01P 2006/64* (2013.01); *C08K 2201/005* (2013.01)

(58) Field of Classification Search
CPC ...... C08K 9/06; C08K 2201/005; C08K 3/36; C09D 7/62; C01P 2004/16; C01P 2006/11; C01P 2006/63; C01P 2001/64; C01P 2004/51; C01P 2004/62; C01P 2006/10; C01P 2006/64
USPC ..................................................... 523/209
See application file for complete search history.

(56) References Cited

U.S. PATENT DOCUMENTS

| | | | |
|---|---|---|---|
| 3,509,082 | A | 4/1970 | Mays |
| 7,537,653 | B2 | 5/2009 | Garcia Luna et al. |
| 8,182,601 | B2 | 5/2012 | Kragten et al. |
| 8,795,427 | B2 | 8/2014 | Kragten et al. |
| 9,266,115 | B2 | 2/2016 | Kragten et al. |
| 9,486,831 | B2 | 11/2016 | Getlichermann et al. |
| 9,776,923 | B2 | 10/2017 | Di Loreto et al. |
| 10,130,973 | B2 | 11/2018 | Getlichermann et al. |
| 10,253,219 | B2 | 4/2019 | Sato et al. |
| 10,377,661 | B2 | 8/2019 | Rampf et al. |
| 10,392,526 | B2 | 8/2019 | Siekman et al. |
| 10,533,102 | B2 | 1/2020 | Mersch et al. |
| 10,562,809 | B2 | 2/2020 | Gleason et al. |
| 11,226,432 | B2 | 1/2022 | Joedicke et al. |
| 11,472,729 | B2 | 10/2022 | Yamada et al. |
| 2011/0244007 | A1* | 10/2011 | Matsui .................. A61Q 17/04 424/401 |
| 2020/0002228 | A1 | 1/2020 | Madec et al. |
| 2021/0061666 | A1 | 3/2021 | Bedford et al. |
| 2021/0340057 | A1 | 11/2021 | Rampf et al. |
| 2022/0106488 | A1 | 4/2022 | Molon et al. |
| 2022/0144691 | A1 | 5/2022 | Ogasawara et al. |
| 2022/0162080 | A1 | 5/2022 | Zilles et al. |
| 2022/0259094 | A1 | 8/2022 | Ogasawara et al. |
| 2023/0332032 | A1 | 10/2023 | Okabe et al. |
| 2024/0010546 | A1 | 1/2024 | Kikkawa et al. |

FOREIGN PATENT DOCUMENTS

| | | |
|---|---|---|
| CA | 3121582 A1 | 6/2020 |
| CN | 109665530 B | 10/2019 |
| CN | 110408237 A | 11/2019 |

OTHER PUBLICATIONS

Azevedo Cubas et al., "The Effect of Investment Materials on the Color of Feldspathic Ceramics", European Journal of Dentistry, 2011, pp. 433-440, vol. 5.
Howe et al., "The occurence of a titanium dioxide/siilica white pigment on wooden Andean qeros: a cultural and chronological marker", Heritage Science, 2018, pp. 1-12. vol. 6, No. 41.
Sibelco Europe, "Improved whiteness and hiding power with Sibelite functional fillers", 2014, 4 pages. (https://coatings.sibelcotools.com/wp-content/uploads/2017/03/Sibelite-whiteness.pdf).
The Quartz Page, "The Silica Group: Overview of silica polymorphs", 2014, pp. 1-18. (http://www.quartzpage.de/gen_mod.html).
SpecialChem, "Extender Pigments in Paint & Coatings: Types, Uses & Properties", 4 pages. (https://coatings.specialchem.com/product-categories/pigments-extenders).
Stoneburner, "A Novel Silica-Based Nano Pigment as a Titanium Dioxide Replacement", Master's Thesis, Western Michigan University, 2014.

(Continued)

*Primary Examiner* — Hannah J Pak
(74) *Attorney, Agent, or Firm* — The Webb Law Firm

(57) ABSTRACT

A cristobalite includes: a d50 particle size selected within a range of from 1 μm to 15 μm; an L color coordinate of greater than 96; a color coordinate of less than 1; and a b color coordinate of 1 or less, in which the cristobalite is a powder. Also provided are compositions containing the cristobalite, coatings formed with compositions, and methods of preparing cristobalite.

25 Claims, 1 Drawing Sheet

(56) References Cited

OTHER PUBLICATIONS

Grace Davison Materials & Packaging Technologies, "Sylowhite™ SM 405 Titanium Dioxide Extender", 2 Pages. (https://www.keysermackay.com/wp-content/uploads/2017/05/SYLOWHITE-TI-English.pdf).
Prospector, "Sylowhite™ SM 405 Titanium Dioxide Extender", 2 Pages. (https://www.ulprospector.com/en/na/Coatings/Detail/304/41305/SYLOWHITE-SM-405-Titanium-Dioxide-Extender).
Benelux Sibelco et al., "Sibelite M3000, M4000, M6000", Mar. 19, 2010, URL:https://coatings.sibelcotools.com/wp-content/uploads/2017/03/TDS_Sibelite_M3000-M4000-M6000_EN.pdf.
Extended European Search Report dated Nov. 10, 2025 issued in related application EP 22805394.8.

\* cited by examiner

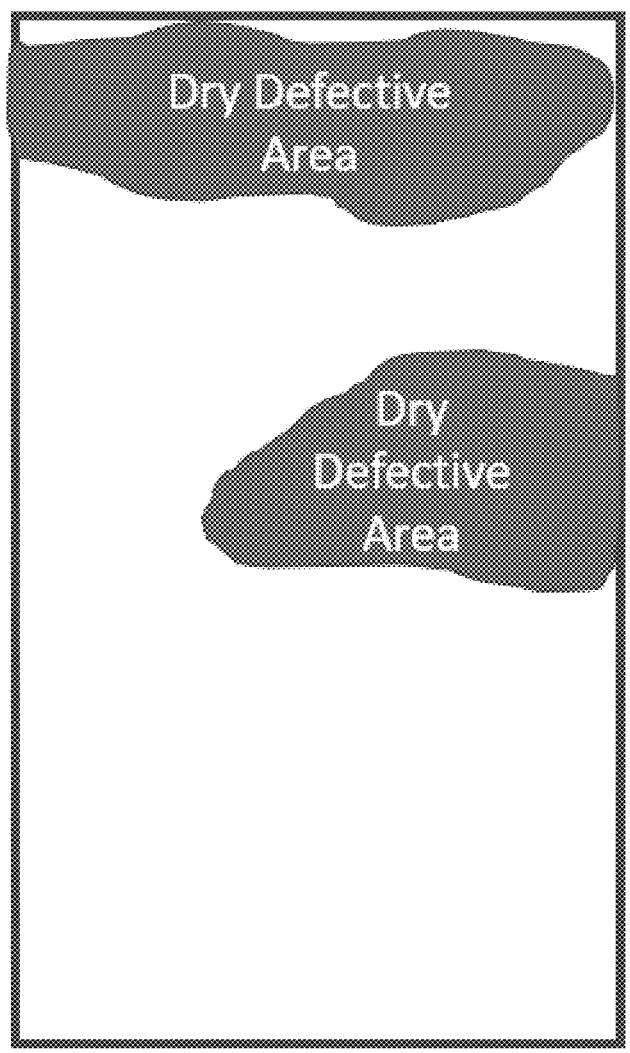

CRISTOBALITE AS A PIGMENT SUBSTITUTE AND AS A COMPOSITION ENHANCING MINERAL, COMPOSITIONS CONTAINING THE SAME, AND ARTICLES AND COATINGS PREPARED WITH SUCH COMPOSITIONS

CROSS REFERENCE TO RELATED APPLICATIONS

This application claims priority to U.S. Provisional Patent Application No. 63/189,781 filed May 18, 2021, which is incorporated herein by reference in its entirety.

BACKGROUND OF THE INVENTION

Field of the Invention

The present invention relates to cristobalite as a pigment substitute and/or as a composition enhancing mineral, compositions containing the same, and articles and coatings prepared with such compositions.

Description of Related Art

Compositions are typically formed from a variety of materials. For example, cement, plastics panels, and cellulose based composites (e.g., particle board) use inorganic minerals as additives or fillers. Such compositions typically include a binder that holds the components of the composition together. However, the binder used in the composition can be expensive, especially when used in large amounts.

In addition, compositions commonly contain pigments that are used in a variety of fields including pigmented coatings applied to numerous surfaces (e.g., treated and untreated plastic or metal surfaces), and articles (e.g., colored plastic articles, colored countertops, colored cement). To obtain a desired color, these compositions are prepared with one or more pigments. While various types of pigments are readily available, some are expensive and/or require large amounts of the pigment to provide the desired appearance. In particular, titanium dioxide, which is typically combined with a binder to form compositions that provide a white color or used in combination with other pigments for different colors, is expensive.

As such, it is desirable to minimize the amount of binder needed in a composition to reduce both the material cost and the defects associated with the binder. It is also desirable to provide new white pigments that can replace and/or reduce the use of titanium dioxide in compositions to reduce costs, which also provide the desired color and appearance.

SUMMARY OF THE INVENTION

The present invention relates to a cristobalite. The cristobalite has a $d_{50}$ particle size selected within a range of from 1 µm to 15 µm, an L color coordinate of greater than 96, an a color coordinate within a range of less than 1, and a b color coordinate of 1 or less. The cristobalite is also a powder.

In certain non-limiting embodiments, the cristobalite has a $d_{50}$ particle size selected within a range of from 2 µm to 10 µm, or within a range of from 5 µm to 15 µm. In some non-limiting embodiments, the cristobalite has an L color coordinate of greater than 98, an a color coordinate of less than 0.5, and/or a b color coordinate of 0.7 or less. The cristobalite can also have a fraction determined by x-ray diffraction of greater than 75%, and/or a loose bulk density of about 40.0 lbm/ft$^3$ and a tap bulk density of about 70 lbm/ft$^3$ at a $d_{50}$ particle size of 15 µm, or a loose bulk density of about 20.0 lbm/ft$^3$ and a tap bulk density of about 40 lbm/ft$^3$ at a $d_{50}$ particle size of 2 µm.

In certain non-limiting embodiments, a coating is applied over at least a portion of a surface of the cristobalite. The coating can include a silane. For instance, the silane can be selected from the group consisting of an alkyl silane, a vinyl silane, and combinations thereof. It is appreciated that the selected silane is an attribute of the selected resin system.

The present invention also relates to a composition for providing a desired colored appearance, such as a white appearance, to an article, and/or as a composition enhancing mineral. The composition includes the cristobalite previously described. In certain non-limiting embodiments, the composition is substantially free of additional pigments other than the cristobalite. Alternatively, in other non-limiting embodiments, the composition further includes at least a second pigment.

In some non-limiting embodiments, the cristobalite comprises at least 20 weight %, based on the total weight of pigments in the composition. The cristobalite used in the composition can also be uncoated or coated as previously described. In certain non-limiting embodiments, the coating further includes a binder resin. In some non-limiting embodiments, the composition can comprise less binder resin than a composition formed with the same materials except for the cristobalite.

The present invention further relates to articles and coatings formed with any of the previously described compositions that provide a desired colored appearance, such as a white appearance, with use of at least the cristobalite. The article can include, for example, a countertop, a plastic article, a paper article, or a cementitious article.

The present invention additionally relates to a method of preparing cristobalite. The method includes: (a) mixing a whole grain silica and a fluxing agent to form a first mixture; (b) processing the mixture through a reaction apparatus at a temperature within a range from 1000° C. to 1200° C. for a time period within a range of 0.5 to 2 hours to obtain cristobalite; (c) filtering the cristobalite through a mesh screen to remove granules larger than 10 to 30 mesh; and (d) grinding unfiltered cristobalite to a powdered cristobalite comprising a $d_{50}$ particle size within a range of from 1 µm to 15 µm.

In certain non-limiting embodiments, the first mixture includes 0.3 weight % or less of either iron oxide or titanium dioxide, based on the total weight of the whole grain silica. The whole grain silica can have a particle size within a range of 30 to 270 mesh, and/or a $d_{50}$ particle size within a range of 40 to 50 mesh.

In some non-limiting embodiments, the fluxing agent is sodium based, potassium based, or a combination of both. The first mixture can also contain 0.3 weight % or less of the fluxing agent, based on the total combined weight of the whole grain silica and the fluxing agent. Further, the pH of the powdered cristobalite formed in step (c) can fall between 8 to 10.

In certain non-limiting embodiments, the method further includes coating the cristobalite with a coating. The coating of the cristobalite can include mixing the powdered cristobalite with water and a dispersant to form a slurry and spraying the slurry with a coating material usually across a countercurrent stream of hot air; mixing the coating material in a cristobalite slurry then drying in a hot air stream; or a dry coating process in a mixer or a media mill. The method can also include adding an acid or base to the slurry prior to spraying the slurry with the coating material under heat. The coating can include a silane as previously described.

The present invention also includes the following clauses.

Clause 1: Cristobalite comprising: a $d_{50}$ particle size selected within a range of from 1 μm to 15 μm; an L color coordinate of greater than 96; an a color coordinate of less than 1; and a b color coordinate of 1 or less, wherein the cristobalite is a powder.

Clause 2: The cristobalite of clause 1, wherein the $d_{50}$ particle size is selected within a range of from 2 μm to 10 μm.

Clause 3: The cristobalite of clause 1, wherein the $d_{50}$ particle size is selected within a range of from 5 μm to 15 μm.

Clause 4: The cristobalite of any one of clauses 1-3, wherein the L color coordinate is greater than 98.

Clause 5: The cristobalite of any one of clauses 1-4, wherein the a color coordinate is less than 0.5.

Clause 6: The cristobalite of any one of clauses 1-5, wherein the b color coordinate is 0.7 or less.

Clause 7: The cristobalite of any one of clauses 1-6, wherein a cristobalite fraction determined by x-ray diffraction is greater than 75%.

Clause 8: The cristobalite of any one of clauses 1-7, wherein the cristobalite has a loose bulk density of about 40.0 $lbm/ft^3$ and a tap bulk density of about 70 $lbm/ft^3$ at a $d_{50}$ particle size of 15 μm, or a loose bulk density of about 20.0 $lbm/ft^3$ and a tap bulk density of about 40 $lbm/ft^3$ at a $d_{50}$ particle size of 2 μm.

Clause 9: The cristobalite of any one of clauses 1-8, further comprising a coating applied over a portion of a surface of the cristobalite.

Clause 10: The cristobalite of clause 9, wherein the coating comprises a silane.

Clause 11: The cristobalite of clause 10, wherein the silane is selected from the group consisting of an alkyl silane, a vinyl silane, an amino silane, an epoxy silane, an alkoxy silane, and combinations thereof.

Clause 12: A composition comprising the cristobalite according to any one of clauses 1-11, wherein the cristobalite is incorporated into the composition as a pigment and/or as a composition enhancing mineral.

Clause 13: The composition of clause 12, wherein the cristobalite is incorporated into the composition as a pigment, and wherein the composition is substantially free of additional pigments other than the cristobalite.

Clause 14: The composition of any one of clauses 12 and 13, wherein at least a portion of a surface of the cristobalite comprises a coating.

Clause 15: The composition of clause 14, wherein the cristobalite coating comprises a silane.

Clause 16: The composition of clause 12, wherein the cristobalite is incorporated into the composition as a pigment, and wherein the composition further comprises at least a second pigment.

Clause 17: The composition of clause 16, wherein the cristobalite comprises at least 20 weight %, based on the total weight of pigments in the composition.

Clause 18: The composition of any one of clauses 16 and 17, wherein the cristobalite is uncoated.

Clause 19: The composition of any one of clauses 12-18, further comprising a binder resin.

Clause 20: The composition of any one of clauses 12-19, wherein the composition comprises less binder resin than a composition formed with the same materials except for the cristobalite.

Clause 21: An article formed with a composition for providing a desired colored appearance, wherein the composition comprises the composition of any one of clauses 12-20.

Clause 22: The article of clause 21, wherein the article is a countertop.

Clause 23: The article of clause 21, wherein the article is a plastic, paper, or cementitious article.

Clause 24: A coating formed with a composition for providing a desired colored appearance, wherein the composition comprises the composition of any one of clauses 12-20.

Clause 25: A method of preparing cristobalite, the method comprising: (a) mixing a whole grain silica and a fluxing agent to form a first mixture; (b) processing the mixture through a reaction apparatus at a temperature within a range from 1000° C. to 1200° C. for a time period within a range of 0.5 to 2 hours to obtain cristobalite; (c) filtering the cristobalite through a mesh screen to remove granules larger than 10 to 30 mesh; and (d) grinding unfiltered cristobalite to a powdered cristobalite comprising a $d_{50}$ particle size within a range of from 1 μm to 15 μm.

Clause 26: The method of clause 25, wherein the whole grain silica comprises 0.3 weight % or less of either iron oxide or titanium dioxide, based on the total weight of the whole grain silica itself.

Clause 27: The method of any one of clauses 25 and 26, wherein the whole grain silica has a particle size within a range of 30 to 270 mesh.

Clause 28: The method of any one of clauses 25-27, wherein the whole grain silica has a $d_{50}$ particle size within a range of 40 to 50 mesh.

Clause 29: The method of any one of clauses 25-28, wherein the fluxing agent is sodium based, potassium based, or combinations of both.

Clause 30: The method of any one of clauses 25-29, wherein the first mixture comprises 0.3 weight % or less of the fluxing agent, based on the total combined weight of the whole grain silica and the fluxing agent.

Clause 31: The method of any one of clauses 25-30, wherein the pH of the powdered cristobalite formed in step (c) falls within a range of 8 to 10.

Clause 32: The method of any one of clauses 25-31, further comprising coating the cristobalite with a coating.

Clause 33: The method of clause 32, wherein coating of the cristobalite comprises: mixing the powdered cristobalite with water to form a slurry and spraying the slurry with a coating material through heated air; mixing the coating material in a cristobalite slurry then drying in a hot air stream; or a dry coating process in a mixer or a media mill.

Clause 34: The method of any one of clauses 32 and 33, wherein the coating comprises a silane.

Clause 35: The method of clause 34, wherein an acid or base is added to the slurry prior to spraying the slurry with the coating material under heat

BRIEF DESCRIPTION OF THE DRAWINGS

FIG. 1 is a top view exemplifying dry spots/surface defects produced on a finished engineered stone composite when decreasing the resin amount.

DESCRIPTION OF THE INVENTION

For purposes of the following detailed description, it is understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in its respective testing measurement.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

As indicated, the present invention includes a cristobalite. As used herein, "cristobalite" refers to a crystalline polymorph of silica. Further, the cristobalite of the present invention is a powder. As explained in further detail herein, the cristobalite of the present invention has physical and chemical characteristics to provide a white color when used in a variety of fields.

In accordance with the present invention, the cristobalite can have a $d_{50}$ particle size selected within a range of from 1 μm to 15 μm, or within a range of from 2 μm to 10 μm, or within a range of from 5 μm to 15 μm, or within a range of from 4 μm to 6 μm. As used herein, a "$d_{50}$ particle size" refers to the median diameter of a sample of particles where 50 volume percent of the particles have sizes less than the $d_{50}$ value given. The $d_{50}$ particle size can be determined by laser diffraction. For instance, the $d_{50}$ particle size can be determined using a Beckman Coulter Inc. (Hialeah, Fla.) model LS 230 laser diffractometer following the instructions contained in the manual. Other methods can also be used to determine particle size. For example, the particle size can also be determined using sieve fraction analysis for larger granules or with Microtrac instruments or sedigraphs for finer powders. It was found that the previously described particle sizes can help with resin distribution and wetting of compositions utilizing the cristobalite as described in further detail herein.

The cristobalite of the present invention can also exhibit certain color properties. It is appreciated that the color properties of the cristobalite can be identified based on the HunterLab 1948 color system. For instance, the cristobalite can have an L color coordinate of greater than 96, or greater than 97, or greater than 98, or greater than 99, or up to 100. The cristobalite can also have an a color coordinate of less than 1, or less than 0.5, or less than 0.3, or within a range of from −0.3 to 0.3, such as within a range of −0.2 to 0.2, or within a range of −0.1 to 0.1, or within a range of −0.1 to 0.08, or within a range of −0.1 to 0.0. The cristobalite can further have a b color coordinate of 1 or less, or 0.7 or less, or 0.6 or less, or 0.5 or less, or 0.4 or less.

The cristobalite can further have a fraction determined by x-ray diffraction of greater than 75%. The x-ray diffraction is determined using an XRD instrument from Bruker or Malvern following the instructions contained therein.

The cristobalite can have a loose bulk density (loose BD) within a range from 35 to 45 lbm/ft³, such as about 40 lbm/ft³ (e.g., 40+/−1), at a $d_{50}$ particle size of 2 μm, or within a range from 15 to 25 lbm/ft³, such as about 20 lbm/ft³ (e.g., 40+/−1), at a $d_{50}$ particle size of 2 μm.

It will be appreciated that loose BD is the bulk density of the cristobalite measured in its aerated state. The loose BD is determined by pouring the material into a container of known volume. The added weight is then divided by the known volume.

The cristobalite can have a tap bulk density (tap BD) within a range of 65 to 75 lbm/ft³, such as about 70 lbm/ft³ (e.g., 60+/−1), at a $d_{50}$ particle size of 15 μm, or within a range from 35 to 45 lbm/ft³, such as about 40 lbm/ft³ (e.g., 40+/−1), at a $d_{50}$ particle size of 2 μm. It will be appreciated that tap BD is the bulk density of the cristobalite measured after compacting the powder. The tap BD is determined as previously described with respect to the loose BD but which further includes compacting the powder.

Further, the cristobalite of the present invention also has a BET surface area of less than 2 m²/g, or less than 1.5 m²/g, or less than 1 m²/g. The BET surface area of the silica is the surface area determined by the Brunauer-Emmett-Teller (BET) method according to ASTM D1993-03.

The cristobalite of the present invention can also be treated with a coating. That is, at least a portion of the surface of the cristobalite can comprise a coating attached thereto. The coating material applied to the surface of the cristobalite can be selected to provide one or more different properties to the cristobalite and/or to interact with other materials mixed with the cristobalite required for certain applications and end products.

In certain non-limiting embodiments, at least a portion of the cristobalite is coated with a silane coating. As used herein, a "silane" refers to a compound derived from $SiH_4$ by substituting organic groups for at least some of the hydrogen atoms. The organic groups can include alkyl groups to form an alkyl silane, vinyl groups to form a vinyl silane, amino groups that form an amino silane, epoxy groups that form an epoxy silane, alkoxy groups that form an alkoxysilane, and combinations thereof.

As used herein, an "alkyl group" refers to a functional group of an organic chemical that contains only carbon and hydrogen atoms which are arranged in a chain. The alkyl group is represented by the general formula $C_nH_{2n+1}$ in which "n" can be selected from a number within a range of 1-20, 1-10, 1-8, 1-5, 1-3, or 1-2. Specific examples include methyl $CH_3$ (derived from methane) and butyl $C_2H_5$ (derived from butane).

Further, the term "vinyl" refers to an ethylene unsaturated group (i.e., a group having a carbon-carbon double bond) which is represented by the following structure: —CH=CH₂.

The term "amino" refers to a group represented by —N(H)(Ra) in which Ra is independently selected from a hydrogen and an organic group, such as an alkyl group. It is appreciated that the amino group can be a primary amino group or a secondary amino group, which is an amine where the amino group is directly bonded to two carbons of any hybridization and the carbons are not carbonyl group carbons.

The term "epoxy" refers to a compound having an oxygen atom joined by single bonds to two adjacent carbon atoms, thereby forming a three-membered ring.

As used herein, the term "alkoxy" refers to an —O-alkyl group. Further, the term "alkoxysilane" refers to a silane compound with at least one alkoxy group bonded to a silicon atom.

As previously described, the silane may contain an alkyl group, a vinyl group, an amino group, an epoxy group, an alkoxy group, or any combination thereof. It is appreciated that the vinyl group, amino group, epoxy group, and alkoxy group may attach to the binder of interests while the Si—OH or Si—O—R (alkyl) will attach to the cristobalite with the elimination of either water or an alcohol. The silane can also have one or multiple alkyl groups, vinyl groups, amino groups, epoxy groups, and/or alkoxy groups. In one example, the silane is (3-Aminopropyl) trimethoxysilane.

It is appreciated that the present invention can also comprise a mixture of the same or different types of cristobalite, such as a mixture of cristobalite having the same type of coating, different types of coatings, no coatings, or any combinations thereof. It was found that the silane coating can provide improved dispersion processing ability and wet flexural strength.

The present invention also includes a method of preparing cristobalite. The method includes: (a) mixing a whole grain silica and a fluxing agent to form a first mixture; (b) processing the mixture through a reaction apparatus at a temperature within a range of from 1000° C. to 1200° C. for a time period within a range of 0.5 to 2 hours to obtain cristobalite; (c) filtering the cristobalite through a mesh screen to remove granules larger than 20 to 30 mesh; and (d) grinding unfiltered cristobalite to a powdered cristobalite comprising a $d_{50}$ particle size within a range of from 1 µm to 15 µm.

As previously mentioned, the method includes mixing a whole grain silica and a fluxing agent to form a first mixture. As used herein, "whole grain silica" can also be referred to as silica sand, quartz sand, and the like. Further, as used herein, the term "whole grain" can also be referred to as "grit", and the term "ground" can also be referred to as a "powder" or "filler".

As used herein, a "fluxing agent" refers to a compound that induces a more rapid morphological phase change. The fluxing agent used in the first mixture can be, for example, sodium based, potassium based, or a combination of both. Non-limiting examples of suitable fluxing agents include sodium hydroxide, potassium hydroxide, and combinations thereof.

The whole grain silica used to form the first mixture is selected to have a particular size and purity. For instance, the whole grain silica can have a particle size within a range of 30 to 270 mesh, such as within a range of 50 to 250 mesh, or within a range of 100 to 200 mesh. The whole grain silica can also have a $d_{50}$ particle size within a range of 40 to 50 mesh. The mesh particle size was determined using ASTM C429 Test Method For Sieve Analysis of Raw Materials for Glass Manufacture ASTM C136 Test Method For Sieve Analysis Of Fine And Coarse Aggregates ISO 13503 Sections 6.1, 6.2, 6.3, and 6.4 API Recommended Practices For Testing Sand Used In Gravel Packing Operations (58) Sections 4 & 5. Further, the $d_{50}$ particle size was determined as previously described but where 50% of the sand passes through the sieves (plotted out and 50% location determined).

As indicated, the whole grain silica used to form the first mixture has a certain purity. That is, the whole silica can be formed from mostly silicon dioxide with only small amounts of other compounds. For example, the whole grain silica can have 0.3 weight % or less, or 0.25 weight % or less, or 0.20 weight % or less, of either iron oxide or titanium dioxide, based on the total weight of the whole grain silica.

The amounts of the whole grain silica and fluxing agent are controlled to maintain a low amount of fluxing agent in the first mixture. In certain non-limiting embodiments, the first mixture contains 0.3 weight % or less of the fluxing agent, based on the total combined weight of the whole grain silica and the fluxing agent. The amount of fluxing agent in the first mixture can also be selected within a range of from 0.1 weight % to 0.3 weight %, based on the total combined weight of the whole grain silica and the fluxing agent.

It is appreciated that the whole grain silica and fluxing agent can be mixed using various methods and instruments known in the art. For instance, the whole grain silica and fluxing agent can be mixed in a paddle or auger mixer where the fluxing agent is sprayed upon individualized whole grain silica particles.

After forming the first mixture, the mixture is processed through a high temperature reaction apparatus to form cristobalite. A non-limiting example of a reaction apparatus that can be used to process the first mixture includes a rotary kiln. The mixture can be processed through the reaction apparatus at a temperature within a range from 1000° C. to 1200° C. for a time period between 0.5 to 2 hours. The resulting cristobalite typically has a pH within a range of 8 to 10, depending upon the level of the fluxing agent.

In accordance with the method of the present invention, the previously described cristobalite formed with the reaction apparatus is next filtered through a screen to remove larger granules. In certain non-limiting embodiments, the cristobalite is filtered through a screen to remove granules larger than 10 to 30 mesh. The remaining/unfiltered cristobalite granules are then ground such, as in in a ceramic ball mill, to form the previously described powdered cristobalite having a $d_{50}$ particle size within a range of from 1 µm to 15 µm, or within a range of from 5 µm to 15 µm, or within a range of from 2 µm to 10 µm, or within a range of from 4 µm to 15 µm, or within a range of from 4 µm to 6 µm. The remaining/unfiltered cristobalite granules can be ground using instruments known in the art such as, for example, a ceramic ball mill and classifier combination. During the grinding process, the feed rate, recycle stream, and classifier speed are set to obtain the final desired particle size distribution.

In certain non-limiting embodiments, the method further includes coating the cristobalite with a coating. The coating of the cristobalite can include mixing the powdered cristobalite with water to form a slurry and spraying the slurry with a coating material under heat. In certain non-limiting embodiments, the slurry is sprayed into a countercurrent hot air dryer to remove the water and small amount of alcohols from the reaction onto the silica surface. The method can also include adding an acid or base to the slurry prior to spraying the slurry with the coating material under heat to accelerate the reaction. The coating applied to the cristobalite can include a silane as previously described. It is appreciated that the coating can also be applied using other method steps, such as mixing the coating material in a cristobalite slurry then drying in a hot air stream, or dry coating in a mixer or a media mill.

In certain non-limiting embodiments, the cristobalite of the present invention is incorporated into a composition for providing a colored appearance, such as a white appearance, and/or as a composition enhancing material. As used herein, the term "composition enhancing mineral" refers to a mineral that, when added to a composition, provides one or more improved properties and/or benefits to the composition other than or in addition to color, or to the process of making the composition.

The composition typically contains additional components, such as when used to form various articles, or coatings applied over the surfaces of various articles. For example, the composition for providing a white appearance may include a binder, additional pigments, and/or other components and additives required to form a desired article or coating. In some non-limiting embodiments, the composition may include additional pigments that when combined with the cristobalite provide a different desired article or coating, such as a grey article or coating for example.

As previously mentioned, the composition can also include a binder and the cristobalite (and optionally other pigments) can be dispersed throughout the binder in the composition. As used herein, a "binder" refers to a constituent material that typically holds all composition components together. The binder can include one or more resins. The term "resin" is used interchangeably with "polymer," and the term polymer refers to homopolymers (e.g., prepared from a single monomer species), copolymers (e.g., prepared from at least two monomer species), and graft polymers.

It is appreciated that the resins used to form the binder are selected based on the end use of the composition. Non-limiting examples of resins that can form at least a portion of the binder of the composition include (meth)acrylate resins, polyurethanes, polyesters, polyamides, polyethers, polysiloxanes, epoxy resins, vinyl resins, copolymers thereof, and combinations thereof. As used herein, "(meth) acrylate" and like terms refers both to the acrylate and the corresponding methacrylate.

Further, the previously described resins can have a variety of functional groups including, but not limited to, carboxylic acid groups, amine groups, epoxide groups, hydroxyl groups, thiol groups, carbamate groups, amide groups, urea groups, isocyanate groups (including blocked isocyanate groups), unsaturated ethylene groups, and combinations thereof. As used herein, "unsaturated ethylene" refers to a group having at least one carbon-carbon double bond and include, but are not limited to, (meth)acrylate groups, vinyl groups, and combinations thereof.

The binder may also include a crosslinker that may be selected to react with the functionality of the one or more resins. As used herein, the term "crosslinker" refers to a molecule comprising two or more functional groups that are reactive with other functional groups and that are capable of linking two or more monomers or polymers through chemical bonds. It is appreciated that the resins that form the binder of the composition can also have functional groups that are reactive with themselves; in this manner, such resins are self-crosslinking.

Non-limiting examples of crosslinkers that may be used in the composition include phenolic resins, amino resins, epoxy resins, triglycidyl isocyanurate, beta-hydroxy (alkyl) amides, alkylated carbamates, (meth)acrylates, isocyanates, blocked isocyanates, polyacids, anhydrides, organometallic acid-functional materials, polyamines, polyamides, aminoplasts, carbodiimides, oxazolines, and combinations thereof.

As previously described, the composition can also include additional pigments in addition to the previously described cristobalite. These additional pigments can be selected to also add a white color or different colors, in addition to the white color of the end product formed from the composition. Non-limiting examples of pigments include titanium dioxide, aluminum trihydrate, carbon black, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), and mixtures thereof. It is appreciated that the additional pigments and cristobalite can be combined to provide different colors to the end product other than white, such as a grey color for example.

When additional pigments are used, the cristobalite can comprise a certain amount of the total weight of the pigments. For instance, when additional pigments are used in the composition, the cristobalite can comprise at least 20 weight %, or at least 30 weight %, or at least 40 weight %, or at least 50 weight %, or at least 60 weight %, or at least 70 weight %, or at least 80 weight %, or at least 90 weight %, based on the total weight of pigments in the composition. In certain non-limiting embodiments, the composition is substantially free (i.e., contains less than 1 weight % based on the total weight of pigments) or completely free of additional pigments.

Other non-limiting examples of components that can be used with the compositions include plasticizers, fillers including inorganic minerals (e.g., quartz materials), metal oxides and flakes, anti-oxidants, hindered amine light stabilizers, UV light absorbers and stabilizers, surfactants, flow and surface control agents, catalysts, reaction inhibitors, dyes, tints, and other customary components used to form a desired end product. The composition can also be free of any one of the previously described additional components.

It is appreciated that the previously described composition can include any of the previously described cristobalites. For instance, the composition can include cristobalite that comprises a coating and/or cristobalite that is uncoated. In certain non-limiting embodiments, the composition includes a binder, cristobalite that comprises a coating, optional additional components for the desired end product, which is substantially free of additional pigments other than the cristobalite. In some non-limiting embodiments, the composition includes a binder, cristobalite that is uncoated, at least a second additional pigment, and optional additional components for the desired end product.

As indicated, the cristobalite can also be used as a composition enhancing mineral. The composition containing the composition enhancing mineral can include any of the previously described additional materials. For instance, the composition can be used as a composite and include one or more additional inorganic or organic minerals/additives, a binder, and/or the like. As used herein, a "composite" refers to a combination of different organic and/or inorganic materials that are added with various continuous and non-continuous reinforcements, fillers, and/or additives to improve material performance. The composite can also be free of one or more additional materials. For instance, the composite can be free of organic materials.

The present invention further relates to an article or coating formed with the previously described compositions for providing a desired color appearance, such as a white appearance. In certain non-limiting embodiments, the article is at least a partially white countertop, such as at least a partially colored quartz countertop, such as a white quartz countertop, commonly found in kitchens, bathrooms, bars, and the like. The composition for forming at least a partially colored quartz countertop, such as a white quartz countertop, can include at least the cristobalite, a binder comprising one or more resins, a quartz material (e.g., crushed quartz, sand quartz, or particles of quartz), and optionally additional additives, such as additional fillers and/or pigments. The quartz material and/or the additional fillers/pigments can have a particular particle size, such as a $d_{50}$ particle size within a range of from 0.5 μm to 15 μm. It was found that the small particle size components previously described provide packing optimization, which fills the voids in the composition and improves flow of resin in-between these voids.

Other non-limiting articles that can be formed from the compositions described herein include plastic, paper, and cementitious articles. It is appreciated that these compositions will include the necessary materials known in the art to form such articles in addition to the cristobalite of the present invention. For example, the composition for forming a plastic article can include at least the cristobalite and a binder having one or more resins for forming plastic materials, such as acrylics, polystyrene, polyethylene, high density polyethylene, nylon, acrylonitrile butadiene styrene, polystyrene, polypropylene, polycarbonate, copolymers thereof, or combinations thereof.

As indicated, the compositions described herein can also be used to form a coating exhibiting at least a partially colored appearance, such as a white appearance. The compositions can include at least the cristobalite of the present invention, a binder having one or more resins that form a film when applied to a surface of a substrate and cured, and optionally a crosslinker. As used herein, the terms "curable", "cure", and the like means that at least a portion of the components that make up the composition are polymerizable and/or crosslinkable, including self-crosslinkable polymers.

The compositions that form the coating can be thermosetting compositions or thermoplastic compositions. As used herein, the term "thermosetting" refers to compositions that "set" irreversibly upon curing or crosslinking, wherein polymer chains of polymeric components are joined together by covalent bonds. This property is usually associated with a cross-linking reaction often induced, for example, by heat or radiation (e.g. visible light, ultraviolet light, infrared radiation, and the like). Thermosetting coating compositions typically comprise a crosslinker. Further, the term "thermoplastic" refers to compositions that include polymeric components that can undergo liquid flow upon additional heating.

The compositions can be applied to a wide range of substrates and cured to form the final coating. These substrates can be metallic or non-metallic. Metallic substrates include tin, steel (including electrogalvanized steel, cold rolled steel, hot-dipped galvanized steel), aluminum, aluminum alloys, zinc-aluminum alloys, and aluminum plated steel. Non-metallic substrates include polymeric, plastic, polyester, polyolefin, polyamide, polystyrene, polyacrylic, polypropylene, polyethylene, nylon, poly(ethyleneterephthalate) (PET), polycarbonate, polycarbonate acrylobutadiene styrene (PC/ABS), wood, veneer, cement, stone, glass, paper, textiles, and the like. Such materials are commonly used to form automotive substrates, industrial substrates, packaging substrates, wood flooring and furniture, apparel, electronics, sports equipment, and the like.

It was found that the compositions containing cristobalite can provide a white color, coatings or other colors when combined with additional pigments, to various articles and coatings, thereby reducing or eliminating the use of titanium dioxide. By reducing or eliminating the use of titanium dioxide, the costs of producing such compositions and articles are significantly reduced.

It was also found that the cristobalite can provide various improvements and benefits as the composition enhancing mineral. For example, the composition that includes cristobalite as the composition enhancing mineral has been found to require less binder resin than a composition that comprises the all same materials except for the cristobalite. It is appreciated that the lower amount of binder resin can lower the costs of the composition and the manufacturing process, result in faster processing times from composition formation to final cure time, lower the occurrence of "pinholes" and other surface defects resulting in higher production yield, and/or result in lower occurrence of resin related defects like warpage or other product deformation. In addition, the cristobalite as the composition enhancing mineral can also reduce the amount of catalyst and initiators needed to manufacture a composition, which can also reduce costs and potential product defects. In some non-limiting embodiments, the cristobalite as the composition enhancing mineral provides improved resin flow that delivers a more uniform resin distribution across the composition and thus reducing the probability of a dry/less-bonded area thus lowering the occurrence of composition mechanical and/or aesthetic defects.

It was also found that the composition comprising cristobalite as the composition enhancing mineral can provide a consistent final compositional color that is not altered by the cristobalite. This in turn provides processing benefits, such as allowing a consistent color without negatively impacting color or significantly altering aesthetics to provide a predictable and repeatable color hue. It is appreciated that the cristobalite as the composition enhancing mineral can be added at certain amounts and/or ratios to other components in the composition to provide a predictable and repeatable color hue. For instance, the cristobalite can be added to a composition as a composition enhancing mineral in an amount of less than 10 weight %, such as within a range of from 0.1 weight % to 8 weight %, or within a range of from 2 weight % to 8 weight %, or within a range of from 2 weight % to 6 weight %, or within a range of from 4 weight % to 6 weight %, based on the total weight of the composition. It is appreciated that the cristobalite can be added as a pigment and as a composition enhancing material/processing aid.

The following examples are presented to demonstrate the general principles of the invention. The invention should not be considered as limited to the specific examples presented. All parts and percentages in the examples are by weight unless otherwise indicated.

Example 1

Preparation and Analysis of Cristobalite

Adequate whole grain silica sources with low iron oxide and low titanium dioxide (ilmenite) levels were selected in which the properties of each silica source were determined based on XRF or ICP information. The oxides besides the whole grain silica source are shown in Table 1 below. It is appreciated that the whole grain silica (i.e., $SiO_2$) makes-up the majority (greater than 99 wt. %) of the compositional make-up with the remainder based on the components and amounts shown in Table 1.

TABLE 1

Composition of Silica Source

| Element Oxide (—) | Sample 1 (PPM) | Sample 2 (PPM) |
| --- | --- | --- |
| $Fe_2O_3$ | 200 | 230 |
| $TiO_2$ | 200 | 150 |
| $Al_2O_3$ | 900 | 1160 |
| CaO | 100 | 30 |
| $K_2O$ | 200 | 50 |
| MgO | 100 | 30 |
| $Na_2O$ | 100 | 20 |

A diluted mixture of sodium hydroxide as a fluxing agent is mixed with the above whole grain silica sources to form mixtures with a sodium oxide level up to 0.2% or 2000 ppm. A large excess of water (about 12% NaOH) is employed along with a paddle mixer (e.g., purchased from Palmer Manufacturing Industries or Feeco) to fully cover the silica granules.

A particle size distribution of the initial granules of Sample 2 is shown in Table 2 below. This is determined in agreement with ASTM C429 and ASTM C136 methodology.

TABLE 2

Precursor Silica Particle Size Distribution

| Mesh Size (—) | Coarse Distribution (% Retained) | Fine Distribution (% Retained) |
| --- | --- | --- |
| 20 | 0% | 0% |
| 30 | 0% | 0.1% |
| 40 | 13.2% | 6.1% |
| 50 | 55.4% | 34.9% |
| 70 | 21.8% | 38.8% |
| 100 | 7.5% | 14.8% |
| 140 | 2% | 4.2% |
| 200 | 0.1% | 0.7% |
| 270 | 0% | 0.4% |
| PAN | 0% | 0% |

After combining the fluxing agent with the silica precursor sands previously described, the mixture is placed into a kiln, such as a rotary kiln (available from FEECO, FLSmidth, and Thermcraft). With the fluxing agent, a temperature in the range of 1000° C.-1200° C. for a time period of 0.5 to 2 hours is used to convert the silica into cristobalite. Granules between 10-15 mesh are then removed after the conversion step.

To prove that the product has been converted sufficiently, a powder color check is conducted using a HunterLab Colorflex EZ unit to show that the dry L exceeds 96, the a value hovers near zero, and the b value is under 1. To further validate the conversion, an apparent density check via a pycnometer from Micromeritics or Anton Paar is conducted showing that the density is reduced from a silica density of 2.65 g/cm$^3$ down to 2.2-2.3 g/cm$^3$. The percent conversion is further shown through XRD (X-Ray Diffraction from Bruker, Olympus, or Rigaku), differentiating the crystals present where the cristobalite exceeds at least 75%.

Next, the cristobalite is ground down using a ball mill (purchased from Eriez or International Process Equipment) that feeds into a classifier (obtained from Stuurtevant, Netzch, or Progressive Industries) that separates the finished particles from a recycle stream to drive the average particle size to 5 microns.

The final products are once again checked for color and the particle distribution either through a Sedigraph or via a Microtrac/Malvem instrument as previously described.

Example 2

Composition Containing Cristobalite as a Pigment

Two engineered stone, quartz countertops were manufactured using identical recipes with the only difference being the reduced titanium dioxide level. The first sample, Sample 1, had the titanium dioxide level at 5 weight % and no cristobalite additive. The second sample, Sample 2, removed over half of the titanium dioxide by weight to 1.8 weight % by replacing it with an equal quantity of cristobalite fine pigment. Below in Table 3 are the compositions.

TABLE 3

| Sample 1 | | Sample 2 | |
|---|---|---|---|
| Polyester Resin | 16% | Polyester Resin | 16% |
| Grit[1] - 0.1 to 0.3 mm | 53% | Grit[1] - 0.1 to 0.3 mm | 53% |
| Filler[2] - 325 mesh | 31% | Filler[2] - 325 mesh | 31% |
| Cobalt 12% | 0.1% | Cobalt 12% | 0.1% |
| Silane | 1.2% | Silane | 1.2% |
| Catalyst | 1.2% | Catalyst | 1.2% |
| Titanium Dioxide Pigment | 5.0% | Titanium Dioxide Pigment | 3.1% |

TABLE 3-continued

| Sample 1 | | Sample 2 | |
|---|---|---|---|
| cristobalite - 2.4 microns at D50 | none | cristobalite - 2.4 microns at D50 | 1.8% |

[1]The grit was cristobalite at a large particle size of at least 0.1 mm (100 micron). It is appreciated that other materials could be used as the grit as described herein, such as silica, sand, and the like.
[2]The filler was cristobalite at a large particle size of at 325 mesh (44 micron). It is appreciated that other materials could be used as the filler as described herein, such as silica, sand, and the like.

The finished slabs were pressed, cured, and polished at identical conditions. The color of the slabs was then tested using a BYK Gardner, Color-guide #6805 with the following method: Cie L*a*b*; geometry: 45 degree/zero degree; and illuminant/observant: D65/ten degree. Both slabs were aesthetically similar with a negligible delta E difference as described as less than one unit of measurement. The color data is summarized in Table 4.

TABLE 4

| Sample 1 | Color Results | Sample 2 | Color Results |
|---|---|---|---|
| CIE L* | 95.09 | CIE L* | 94.62 |
| CIE a* | −0.80 | CIE a* | −0.64 |
| CIE b* | 2.39 | CIE b* | 2.16 |
| Delta E cmc | 0 | Delta E cmc | 0.36 |

Example 3

Preparation of Composition Containing Cristobalite as a Composition Enhancing Mineral and a Composite Therefrom Three engineered stone composites (quartz countertops) were manufactured using similar compositions to demonstrate how finely ground cristobalite as a composition enhancing mineral (processing aid) can lower resin usage without impacting the quality of the final composite. Each of the compositions' primary components, whole grain silica (grit), ground powder (filler), and polyester resin (binder) were all identical. The compositions in Table 5 are based on industry practice of having resin, grit, and filler totaling 100% by weight and all other components being accounted for as a weight percentage above 100%. The first sample, Sample 1, is considered the control sample with a level of resin at 15.5% by weight, which is typical for this production facility to make acceptable quality with no noticeable surface defects. The second sample, Sample 2, is a comparative sample and used the same composition as Sample 1, except 1% of the polyester resin with a starting level of 14.5% by weight. As can be seen in FIG. 1, this 1% resin decrease will have an impact on quality with the appearance of surface defects indicating dry sections (low resin distribution) of the slab. The last sample, Sample 3, corresponding to the present invention also reduces the resin by 1%, except a composition enhancing mineral of finely ground cristobalite was added to eliminate the defects. Table 5 below lists the components and corresponding amounts used in each composition.

TABLE 5

| Sample 1 (Control) | | Sample 2 (Comparative) | | Sample 3 | |
|---|---|---|---|---|---|
| Polyester Resin | 15.5% | Polyester Resin | 14.5% | Polyester Resin | 14.5% |
| Grit[1] - 0.1 to 0.3 mm | 57% | Grit[1] - 0.1 to 0.3 mm | 58% | Grit[1] - 0.1 to 0.3 mm | 58% |
| Filler[2] - 325 mesh | 27.5% | Filler[2] - 325 mesh | 23.5% | Filler[2] - 325 mesh | 23.5% |
| Cobalt 12% | 0.03% | Cobalt 12% | 0.03% | Cobalt 12% | 0.03% |
| Silane | 1.5% | Silane | 1.5% | Silane | 1.5% |
| Catalyst | 1.2% | Catalyst | 1.2% | Catalyst | 1.2% |
| Titanium dioxide - Pigment | 2.0% | Titanium dioxide Pigment | 2.0% | Titanium dioxide Pigment | 2.0% |

TABLE 5-continued

| Sample 1 (Control) | | Sample 2 (Comparative) | | Sample 3 | |
|---|---|---|---|---|---|
| cristobalite - 2.4 microns at D50 | none | cristobalite - 2.4 microns at D50 | none | cristobalite - 2.4 microns at D50 | 4% |

[1] The grit was cristobalite at a large particle size of at least 0.1 mm (100 micron). It is appreciated that other materials could be used as the grit as described herein, such as silica, sand, and the like.
[2] The filler was cristobalite at a large particle size of at 325 mesh (44 micron). It is appreciated that other materials could be used as the filler as described herein, such as silica, sand, and the like.

As shown in Table 6, the impact of reduced resin can be seen by comparing Sample 1 and Sample 2 slabs with a 36% reduction of usable slab and ultimately classifying the end composite at "Less than B Grade". This loss of quality is typical of many operations which attempt to reduce resin and results in dry spots on the finished slab, as exemplified in FIG. 1. Sample 3 demonstrates the benefit of using finely ground cristobalite as a composition enhancing material/processing aid with a reduced resin loading identical in Sample 2 without the quality issues.

TABLE 6

| | Sample 1 (Control) | Sample 2 (Comparative) | | Sample 3 | |
|---|---|---|---|---|---|
| Slab Grade | A Grade | Slab Grade | Less than B Grade | Slab Grade | A Grade |
| Percentage of usable slab | 100% | Percentage of usable slab | 64% | Percentage of usable slab | 100% |

Example 4

Preparation of Composition Containing Cristobalite as a Pigment

Three engineered stone countertops were manufactured using identical compositions, with the only difference being that one sample was a control having no extender, one sample using a cristobalite based extender, and the final sample using a non-cristobalite extender. Each of the compositions' primary ingredients, whole grain silica (grit), ground powder (filler), and polyester resin (binder) were all identical. The compositions listed in Table 7 are based on industry practice of having resin, grit, and filler totaling 100% by weight and all other components accounted for as additional weight percentages above 100%. The first sample, Sample 1, is considered the control example with a base level of titanium and no extender added. The second sample, Sample 2, used the same composition as Sample 1, except a reduction of titanium dioxide had occurred and was replaced with a finely ground cristobalite extender. The last sample, Sample 3, is a comparative example and is identical to Sample 2, except this composition used a silica-based mineral as a non-cristobalite extender.

TABLE 7

| Sample 1 (Control) | | Sample 2 | | Sample 3 (Comparative) | |
|---|---|---|---|---|---|
| Polyester resin | 16% | Polyester Resin | 16% | Polyester Resin | 16% |
| Grit[1] - 0.1 to 0.3 mm | 53% | Grit[1] - 0.1 to 0.3 mm | 53% | Grit[1] - 0.1 to 0.3 mm | 53% |
| Filler[2] - 325 mesh | 31% | Filler[2] - 325 mesh | 31% | Filler[2] - 325 mesh | 31% |
| Cobalt 12% | 0.1% | Cobalt 12% | 0.1% | Cobalt 12% | 0.1% |
| Silane | 1.2% | Silane | 1.2% | Silane | 1.2% |
| Catalyst | 1.2% | Catalyst | 1.2% | Catalyst | 1.2% |
| Titanium dioxide Pigment | 5.0% | Titanium dioxide Pigment | 3.1% | Titanium dioxide - Pigment | 3.1% |
| cristobalite - 2.4 microns at D50 | none | cristobalite - 2.4 microns at D50 | 1.8% | Silica sand - 2.4 microns at D50 | 1.8% |

[1] The grit was cristobalite at a large particle size of at least 0.1 mm (100 micron). It is appreciated that other materials could be used as the grit as described herein, such as silica, sand, and the like.
[2] The filler was cristobalite at a large particle size of at 325 mesh (44 micron). It is appreciated that other materials could be used as the filler as described herein, such as silica, sand, and the like.

The finished slabs were pressed, cured and polished at identical conditions. The color of the slabs was then tested using a BYK Gardner, Color-guide #6805 with the following method: Cie L*a*b*; geometry: 45 degree/zero degree; and illuminant/observant: D65/ten degree. Both slabs were aesthetically similar with a negligible delta E difference as described as less than one unit of measurement. The color data is summarized in Table 8.

TABLE 8

| Sample 1 (Control) | Color Results | Sample 2 | Color Results | Sample 3 (Comparative) | Color Results |
|---|---|---|---|---|---|
| CIE L* | 95.09 | CIE L* | 94.62 | CIE L* | 90.31 |
| CIE a* | −0.80 | CIE a* | −0.64 | CIE a* | −5.44 |
| CIE b* | 2.39 | CIE b* | 2.16 | CIE b* | 5.50 |
| Delta E cmc | 0 | Delta E cmc | 0.36 | Delta E cmc | 7.29 |

Even though the cristobalite extender and non-cristobalite extenders had similar particle size distributions, the importance in extender color can be seen between the Sample 2 and Sample 3 results. The most noticeable difference is summarized with the total Delta E being 7.29 units between the control of Sample 1 and the non-cristobalite extender of Sample 3. Whereas the composite slab that used cristobalite extender, Sample 2, resulted in less than a 1 unit Delta E difference with a 0.36 measurement when compared to Sample 1.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A cristobalite comprising:
   a $d_{50}$ particle size selected within a range of from 1 μm to 15 μm;
   an L color coordinate of greater than 96;
   an a color coordinate of less than 1; and
   a b color coordinate of 1 or less,
   wherein the cristobalite is a powder,
   wherein the cristobalite comprises a silica density within a range of from 2.2 to 2.3 g/cm$^3$ and a cristobalite fraction determined by x-ray diffraction is greater than 75%.

2. The cristobalite of claim 1, wherein the $d_{50}$ particle size is selected within a range of from 2 μm to 10 μm.

3. The cristobalite of claim 1, wherein the $d_{50}$ particle size is selected within a range of from 5 μm to 15 μm.

4. The cristobalite of claim 1, wherein the L color coordinate is greater than 98.

5. The cristobalite of claim 1, wherein the a color coordinate is less than 0.5.

6. The cristobalite of claim 1, wherein the b color coordinate is 0.7 or less.

7. The cristobalite of claim 1, wherein the cristobalite also has a loose bulk density of about 40.0 lbm/ft$^3$ and a tap bulk density of about 70 lbm/ft$^3$ at a $d_{50}$ particle size of 15 μm, or a loose bulk density of about 20.0 lbm/ft$^3$ and a tap bulk density of about 40 lbm/ft$^3$ at a $d_{50}$ particle size of 2 μm.

8. The cristobalite of claim 1, further comprising a coating applied over at least a portion of a surface of the cristobalite.

9. The cristobalite of claim 8, wherein the coating comprises a silane.

10. A composition comprising the cristobalite according to claim 1, wherein the cristobalite is incorporated into the composition as a pigment and/or as a composition enhancing mineral.

11. The composition of claim 10, wherein the cristobalite is incorporated into the composition as a pigment, and wherein the composition is substantially free of additional pigments other than the cristobalite.

12. The composition of claim 10, wherein the cristobalite is incorporated into the composition as a pigment, and wherein the composition further comprises at least a second pigment.

13. The composition of claim 12, wherein the cristobalite comprises at least 20 weight %, based on the total weight of pigments in the composition.

14. The composition of claim 10, further comprising a binder resin.

15. The composition of claim 14, wherein the composition comprises less binder resin than a composition formed with the same materials except for the cristobalite.

16. An article formed with a composition for providing a colored appearance, wherein the composition comprises the composition of claim 10.

17. The article of claim 16, wherein the article is a countertop, plastic, paper, or cementitious article.

18. A coating formed with a composition for providing a colored appearance, wherein the composition comprises the composition according to claim 10.

19. A method of preparing cristobalite, the method comprising:
   (a) mixing a whole grain silica and a fluxing agent to form a first mixture;
   (b) processing the mixture through a reaction apparatus at a temperature within a range from 1000° C. to 1200° C. for a time period within a range of 0.5 to 2 hours to obtain cristobalite;
   (c) filtering the cristobalite through a mesh screen to remove granules larger than 10 to 30 mesh; and
   (d) grinding unfiltered cristobalite to a powdered cristobalite comprising a $d_{50}$ particle size within a range of from 1 μm to 15 μm, and wherein the powdered cristobalite comprises a silica density within a range of from 2.2 to 2.3 g/cm$^3$ and a cristobalite fraction determined by x-ray diffraction is greater than 75%.

20. The method of claim 19, wherein the whole grain silica comprises 0.3 weight % or less of a total amount of either iron oxide or titanium dioxide, based on the total weight of the whole grain silica itself.

21. The method of claim 19, wherein the whole grain silica has a $d_{50}$ particle size within a range of 30 to 270 mesh.

22. The method of claim 19, wherein the whole grain silica has a $d_{50}$ particle size within a range of 40 to 50 mesh.

23. The method of claim 19, wherein the first mixture comprises 0.3 weight % or less of the fluxing agent, based on the total combined weight of the whole grain silica and the fluxing agent.

24. The method of claim 19, wherein a pH of the powdered cristobalite is within a range of 8 to 10.

25. A cristobalite comprising:
   a $d_{50}$ particle size selected within a range of from 1 μm to 15 μm;
   an L color coordinate of greater than 96;
   an a color coordinate of less than 1; and
   a b color coordinate of 1 or less,
   wherein the cristobalite is a powder, and
   wherein the cristobalite has a loose bulk density of about 40.0 lbm/ft$^3$ and a tap bulk density of about 70 lbm/ft$^3$ at a $d_{50}$ particle size of 15 μm, or a loose bulk density of about 20.0 lbm/ft$^3$ and a tap bulk density of about 40 lbm/ft$^3$ at a $d_{50}$ particle size of 2 μm.

* * * * *